United States Patent [19]
Lamson

[11] 3,950,683
[45] Apr. 13, 1976

[54] MOTOR CONTROL SYSTEM HAVING DEAD BAND CONTROL

[75] Inventor: Wade Petherbridge Lamson, Pepperpike, Ohio

[73] Assignee: Cleveland Machine Controls, Inc., Cleveland, Ohio

[22] Filed: June 5, 1974

[21] Appl. No.: 476,690

[52] U.S. Cl. ............... 318/327; 318/343; 318/344
[51] Int. Cl.² ........................................... H02P 5/00
[58] Field of Search .......... 318/326, 327, 342, 343, 318/344, 624, 635

[56] References Cited
UNITED STATES PATENTS

| | | |
|---|---|---|
| 3,450,973 | 6/1969 | Tobey .......................... 318/327 X |
| 3,736,486 | 5/1973 | Gould et al. .................... 318/624 |
| 3,745,436 | 6/1973 | Buttafava ..................... 318/327 X |

Primary Examiner—G. Z. Rubinson

[57] ABSTRACT

A motor control system is disclosed for use in controlling a DC motor. This system employes a high gain DC amplifier for providing command signals to a motor control circuit which, in turn, controls energization of the motor to vary the motor speed dependent upon the magnitude of a command signal. A dead band range of operation of the DC amplifier is obtained to prevent motor creeping when the motor speed signal calls for zero speed. This is achieved with a negative feedback network which is operative only over a limited range of input signals to effectively nullify the motor speed command signal.

12 Claims, 2 Drawing Figures

MOTOR CONTROL SYSTEM HAVING DEAD BAND CONTROL

This invention relates to the art of motor control systems and is particularly applicable for use in conjunction with high gain regenerative drive motor controls to achieve zero motor speed in response to zero speed command; although, it is to be appreciated that the invention may be employed in various motor control applications requiring that a DC motor be brought to a stop condition in response to a zero speed command.

High gain regenerative drive motor control systems are frequently employed for controlling reversible DC motors. Particularly, such motors are operated such that the motor speed is controlled as a function of the difference between an actual motor speed signal, obtained as with the use of a tachometer generator, and a motor speed reference signal, obtained as from a potentiometer. The difference between these two signals is an error signal having a polarity indicative of commanded motor direction and a magnitude indicative of commanded motor speed. The error signal is amplified by a high gain DC amplifier and then applied as a command signal to a motor control circuit which responds to the magnitude and polarity of the command signal to control energization of the motor to obtain commanded motor direction and speed.

A notable problem encountered with such high gain regenerative drive control systems is that it is difficult to obtain a positive shut-off at a zero speed command. This is because there is a tendency for the output of the high-gain speed amplifier to have some output signal which is passed to the motor control circuit, causing the motor to creep. Previous attempts to cure this problem have included installation of zero speed command sensing circuitry which deactivates the drive motor control circuit in response to an error signal indicative of a zero speed command. However, such attempts have resulted in substantially expensive and complex circuitry adding to the expense of motor control installation and repair. Other attempts in the prior art have included the provision of a negative feedback path between the output and the input of the high gain speed amplifier. However, this drastically limits the gain of the amplifier throughout the desired motor speed range, thereby limiting accuracy of speed control.

It is desirable, therefore, that such a high gain regenerative drive motor control system operate such that signals representative of essentially zero speed commands do not result, as from high gain drift of the speed amplifier, with motor drift or creep. Thus it is desirable that there be a dead band range of operation of the high gain speed amplifier wherein it is not effective to pass a motor speed command signal to the motor control circuitry. However, if this dead band be provided, it should not limit the gain of the amplifier throughout the entire speed range of motor operation.

It is therefore a primary object of the present invention to obtain a limited dead band range of operation of such a speed amplifier while not limiting the gain of the amplifier beyond the dead band range.

It is a further object of the present invention to provide a dead band range of operation for such a speed amplifier with a negative feedback network about the amplifier and which is effective to limit the gain of the amplifier only over a limited range of error signals in the vicinity of zero speed command.

It is a still further object of the invention to provide such dead band control as discussed above wherein the dead band range is adjustable, as by a manually adjustable potentiometer.

The present invention contemplates a motor control system for controlling a DC motor. In such a system a DC reference signal is provided, and which is representative of desired motor speed. Also, a DC motor signal is provided, as with the use of a tachometer generator, and which is representative of actual motor speed. An error signal is provided having a magnitude representative of the difference between the desired motor speed and the actual motor speed. This error signal is amplified by a DC amplifier and a command signal, proportional to the error signal, is applied to a motor control circuit to control energization of the motor to vary the motor speed in dependence upon the magnitude of the command signal.

In accordance with the present invention, a dead band range of operation of the amplifier is obtained to effectively nullify the DC command signal to achieve essentially zero motor speed. An offset signal is applied to the input of the DC amplifier so as to oppose the error signal in such a manner to effectively nullify the command signal only within a given range of magnitudes of the input reference signal in the region of a desired motor speed of zero. The range may be considered as a dead band.

DESCRIPTION OF THE DRAWINGS

The foregoing and other objects and advantages of the invention will become more readily apparent from the following description of the preferred embodiments of the invention as taken in conjunction with the accompanying drawings which are a part hereof and wherein.

DESCRIPTION OF PREFERRED EMBODIMENTS

Figure 1:
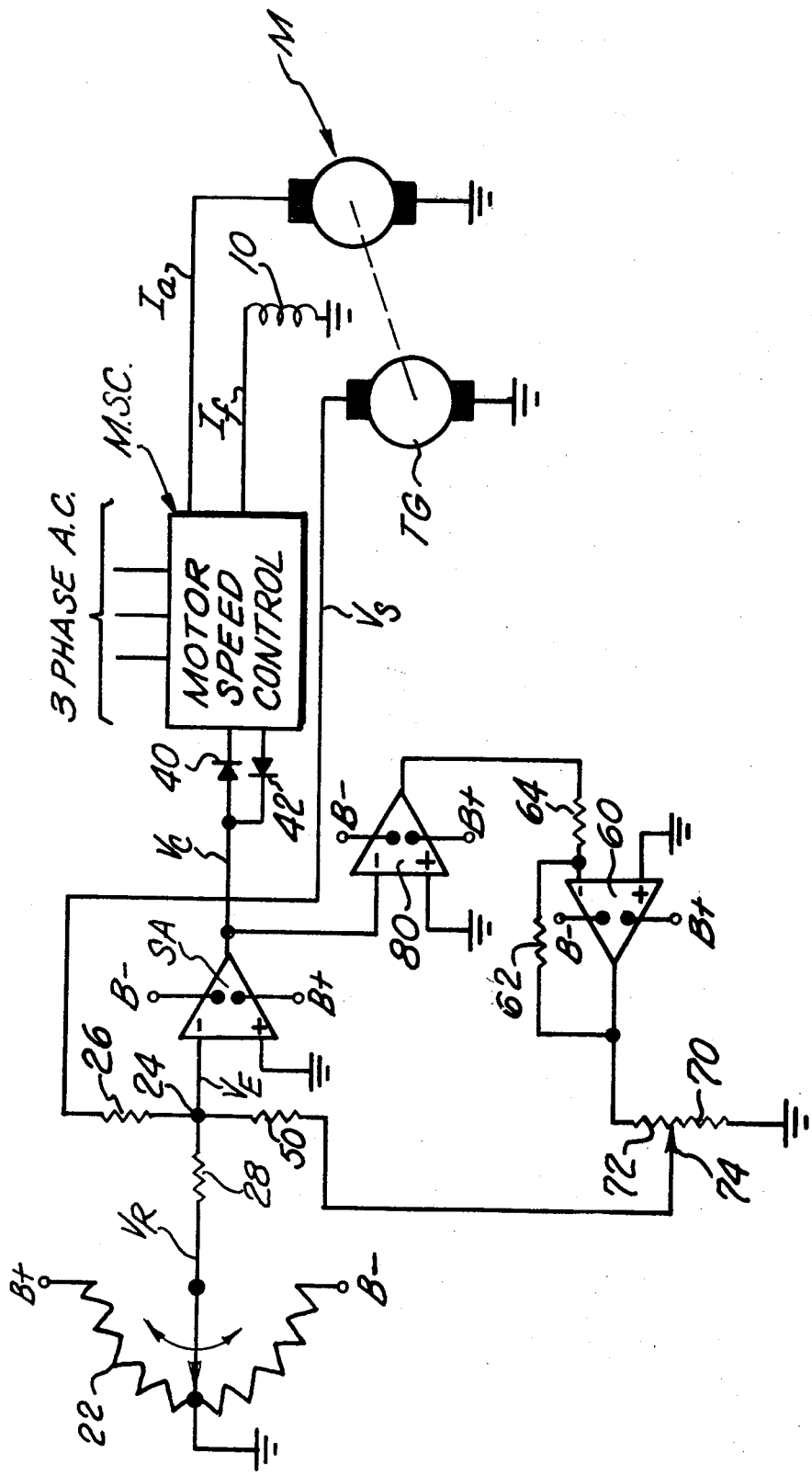
FIG. 1 is a schematic-block diagram illustration of one embodiment of the invention.

Referring now to the drawings, wherein the showings are for purposes of illustrating preferred embodiments of the invention only, and not for purposes of limiting same, FIG. 1 illustrates one embodiment of the invention as applied to a high gain regenerative drive control for controlling a direct current motor. This motor may take the form, for example, of a conventional reversible shunt wound DC motor having an armature winding (within the motor) for receiving armature current $I_A$ and a shunt field winding 10 for receiving field current $I_F$. The motor speed and direction is controlled by motor speed control circuit MSC. This is a conventional control circuit and, for example, may take the form as described and illustrated in U.S. Pat. No. 3,421,065 issued to L. Stabile on Jan. 7, 1969. Briefly, such a control circuit will operate the motor M in dependence upon the difference between a reference speed signal and a measured speed signal. The measured speed signal may be obtained from the armature voltage or with a direct current tachometer generator TG coupled to motor M. This provides a direct current voltage signal $V_S$ exhibiting a magnitude corresponding with motor speed and exhibiting a polarity corresponding with motor direction. The reference speed signal $V_R$ may be obtained from the wiper arm 20 of a potentiometer 22.

Potentiometer 22 is illustrated herein as being a center tapped potentiometer having its opposite ends respectively connected to B+ and a B− direct current voltage supplies. Consequently, the reference speed signal of $V_R$ may be of positive or negative polarity commanding forward or reverse motor operation. The magnitude of the signal commands motor speed. The speed reference signal $V_R$ and the measured speed signal $V_S$ are compared, as with a current summing junction 24 for the purposes of providing an error signal $V_E$ having a polarity dependent upon the signal comparison and a magnitude dependent upon the signal difference. The output from the tachometer generator TG is applied to the current summing point by way of a resistor 26. Similarly, the output from the wiper arm 20 is applied to the current summing junction by way of a resistor 28.

The error signal $V_E$ is applied to the inverting input of a high gain operational amplifier serving as the speed amplifier SA. This amplifier has its non-inverting input connected to ground and is conventionally supplied with B+ and B− operating potential. The output obtained from the amplifier SA may be referred to as the command signal $V_C$. This command signal is an amplified version of the error signal $V_E$ and, consequently, has a magnitude corresponding with commanded speed and a polarity indicative of commanded direction. Signal $V_C$ is applied through one of two signal blocking diodes 40 or 42 and thence to the motor speed control circuit MSC. Depending upon the polarity of signal $V_C$ it will be passed by diode 40 or diode 42 providing that the signal exceeds a threshold level represented by the diode drop. This may be on the order of plus or minus 0.6 volts. This threshold level may be chosen in accordance with the level of input signal required to operate amplifiers and components employed in the motor speed control MSC. The motor speed control circuit also receives power from a 3-phase alternating current source and, in dependence upon the magnitude and polarity of the received command signal $V_C$, will operate to control the speed and direction of motor M by controlling the field count $I_F$ and the armature count $I_A$ in a known manner.

It is known that in such high gain regenerative drive motor control system as discussed thus far, the speed reference signal $V_R$, as adjusted by wiper 20, may be representative of a desired motor speed of zero but yet the motor M will creep. This tendency for the motor to creep in response to a zero speed reference signal $V_R$ results from the high gain provided by the speed amplifier SA. Thus, any stray inputs applied to the negative or inverting input of this operational amplifier will result in the development of a small but false command signal $V_C$.

It is desirable to obtain a dead band range of operation of the DC speed amplifier SA in the region of essentially zero signal $V_R$. In accordance with the invention, this is achieved by applying an offset signal through resistor 50 to the current summing junction 24 such that the offset signal opposes the input speed reference signal $V_R$. This may be illustrated as corresponding with a zone 52 about the center tap on potentiometer 22. In this zone, the speed reference signal $V_R$ will be ineffective to drive motor M. This offset signal is obtained from a negative feedback network and if maintained throughout the total range of operation, it will result in reduced gain, causing high levels of error signal, thereby reducing the drive accuracy.

In accordance with the present invention, the speed amplifier SA is provided with a dead band such that high negative feedback is provided through resister 50 in the region of an essentially zero input signal, but the feedback is removed once the error signal $V_E$ reaches a discrete adjustable signal voltage level. At that point, the speed amplifier is restored to its normal high gain operation. This is achieved with the use of a saturable operational amplifier 60 having a gain in accordance with feedback resistors 62 and 64. Preferably, resister 62 has a magnitude on the order of twice that of resister 64 to limit the gain of the amplifier. The output from amplifier 60 is applied across the resistance portion 70 of a potentiometer 72 having a movable wiper arm 74. Input signals applied through resister 64 to the negative input of operational amplifier 60 will be amplified to develop an output signal voltage across resister 70 proportional to the input signal until the amplifier attains saturation, determined by the magnitude of B+ and B− voltage sources. Consequently then, the maximum output voltage that can be obtained across resister 70 may be on the order of plus or minus 12 volts DC. Depending on the position of the wiper arm 74, this maximum voltage will determine the maximum magnitude of the offset feedback current applied through resister 50 to the current summing junction 24.

Figure 2:
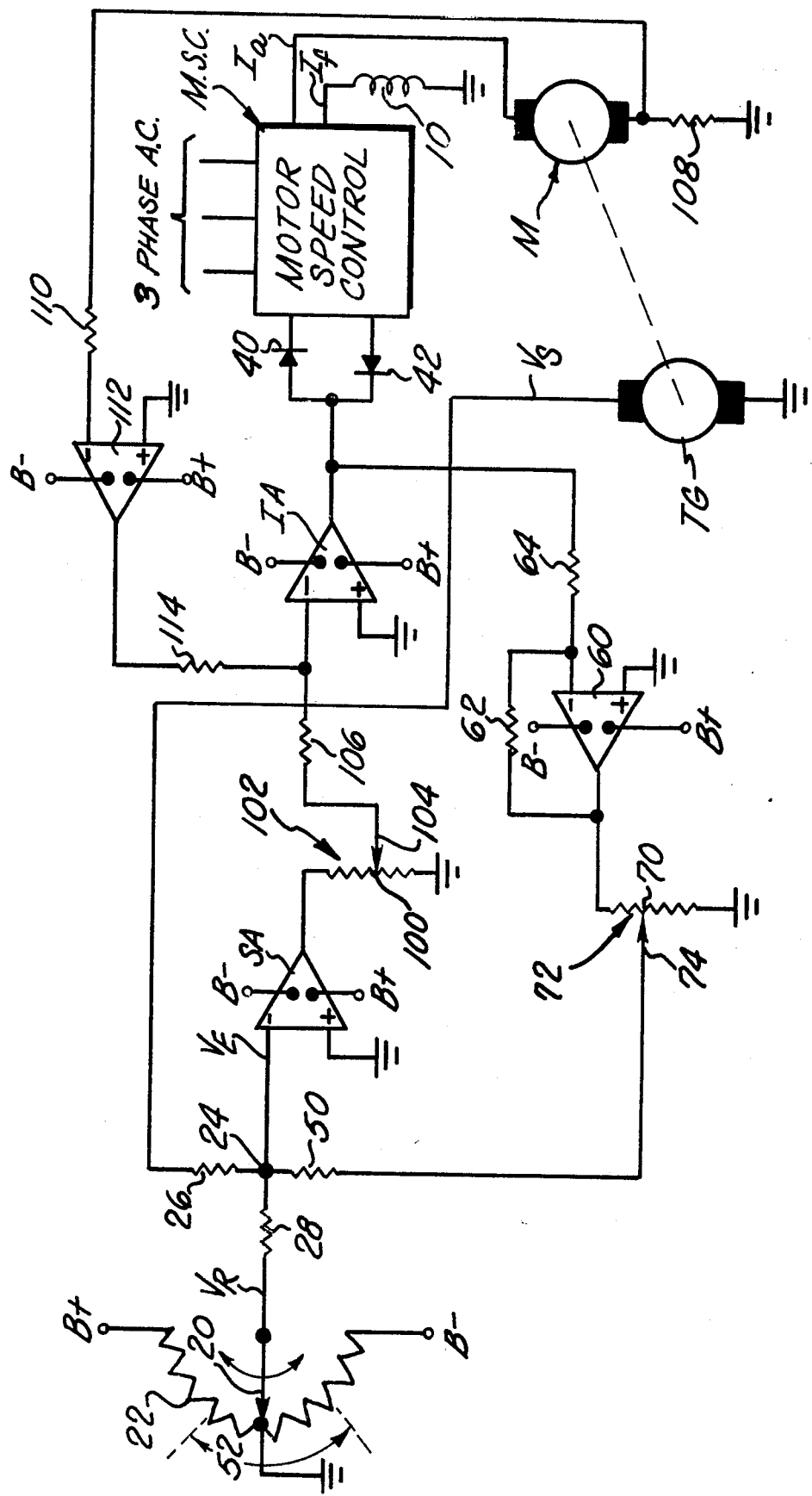
FIG. 2 is a schematic-block diagram illustration of a second embodiment of the invention.

In the embodiment shown in FIG. 1, the feedback network is employed only about a single operational amplifier SA (as opposed to the two operational amplifiers in FIG. 2). In order to achieve correct signal polarity an inverting amplifier 80 is interposed between the output of the speed amplifier SA and the inverting input of the saturable amplifier 60. If a drift voltage on the output of amplifier SA is positive, then a positive polarity offset current signal must be applied through resister 50 in order to nullify the drift signal. The positive drift signal is inverted by inverter amplifier 80 so that the output voltage obtained from saturable amplifier 60 will be of positive polarity.

The resisters 62 and 64 in the feedback network for saturable amplifier 60 determine the gain of the amplifier and, hence, the level of input signal which will result in saturation of the amplifier. The level of input signal which will result in saturation may be chosen arbitrarily, if desired. However, in the embodiment illustrated herein, this input signal level was chosen so as to be just less than the signal level required to exceed the diode drop of diode 40 or 42. This level, for example, may be on the order of 0.6 volts. Once the output signal from the speed amplifier has attained this level, the amplifier 60 will saturate. Beyond this signal level, the feedback network will be ineffective to provide additional feedback current.

Whereas the feedback network 62, 64 determines the level of input signal which results in saturation of amplifier 60, the adjustment of wiper arm 74 will determine the size of the dead band zone 52. That is, the adjustment of wiper arm 74 will determine, for any given output voltage of amplifier 60, the magnitude of the feedback current applied through resister 50 to the current summing point 24. This results in an adjustable dead band.

Attention is now directed to the embodiment illustrated in FIG. 2. This embodiment of the invention is quite similar to that illustrated in FIG. 1 and in an effort to simplify an understanding of the invention, like components in both figures are identified with like character references. Only the differences in the two circuits will be discussed below. Basically, this embodiment includes a two-stage amplifier circuit between the current summing-junction 24 and the motor speed control circuit MSC. Thus, the output of the speed amplifier SA is applied across the resistance portion 100 of a potentiometer 102 having its wipe arm 104 connected through a resister 106 to the inverting input of a current amplifier IA. Such an amplifier is conventionally employed in series with a speed amplifier for controlling armature current and receives a current feedback signal representative of actual armature current. This may be achieved, for example, by connecting a resister 108 in the armature circuit and applying the voltage developed thereacross as an input through a resister 110 to the inverting input of an operational amplifier 112. This provides a current reference which is applied through resister 114 to a current summing junction and thence to the inverting input of the current amplifier IA.

In this embodiment of the invention, the negative feedback network to achieve dead band control serves to compensate for drift voltages of both amplifiers SA and IA and is taken from the output circuit of amplifier IA to the summing junction 24, connected to the inverting input of amplifier SA. It will be noted that the circuitry of FIG. 2 does not include an inverter amplifier 80 as in the case of the embodiment in FIG. 1. Thus, the inverting function performed by amplifier 80 in FIG. 1 is performed by the current amplifier IA in FIG. 2.

In the embodiments of the invention described herein, dead band control is achieved with a limited range, negative feedback network between the output and input circuits of an amplifying means. This feedback network includes a saturable amplifier having its gain adjusted so as to achieve saturation when the input signal attains a particular level. In the embodiments illustrated, the input signal to achieve saturation is chosen so as to be just below the diode drop voltage. A selected portion of the output voltage from the saturable amplifier is used to provide the negative feedback current and, hence, determine the dead band zone of operation. The dead band zone may be varied by varying the magnitude of the feedback current, as with potentiometer 70. This is true until the amplifier reaches saturation at which point it will be ineffective to supply any additional feedback current to the summing junction 24. Consequently then, the circuit serves to provide high negative feedback in the region of essentially zero input signal. This feedback is essentially removed once the amplifier 60 saturates and the operating gain is restored to the operational amplifiers SA and IA.

Whereas the invention has been described in conjunction with preferred embodiments it is not limited thereto as various modifications will occur to those skilled in the art within the scope of the appended claims.

What is claimed is:

1. A motor control system for controlling a DC motor comprising:
   means for providing a DC reference signal representative of desired motor speed;
   means for providing a DC motor signal representative of actual motor speed;
   means responsive to said reference signal and to said motor signal for providing a DC error signal representative of the difference between said desired motor speed and said actual motor difference between said desired motor speed and said actual motor speed;
   DC amplifying means having input circuit means for receiving a said DC error signal to be amplified and having output circuit means for carrying a DC command signal proportional to said error signal and having a magnitude representative of the amount by which said motor speed must be changed;
   motor control means for controlling energization of said motor to vary the motor speed in dependence upon the magnitude of said command signal; and,
   dead band control means for effecting a dead band range of operation of said DC amplifying means to effectively nullify said DC command signal for achieving essentially zero motor speed comprising offset signal means for applying an offset signal to said input circuit means of said amplifying means to oppose said error signal in such a manner as to effectively nullify said command signal only within a given range of magnitudes of said input reference signal representative of motor speed near zero so that throughout said given range of said reference signal a dead band range of operation is achieved, said offset signal means including a negative feedback network interposed between said output and input circuit means of said amplifying means, said network including saturable amplifier means coupled to said output means of said amplifying means for providing an amplified output signal proportional to said command signal until said command signal attains a threshold level at which said saturable amplifier means saturates.

2. A motor control system as set forth in claim 1, wherein said offset signal means includes signal adjustable means for varying the magnitude of said offset signal to thereby vary said dead band range.

3. A motor control system as set forth in claim 2, wherein said signal adjustable means includes manually operable means for adjusting the magnitude of said offset signal.

4. A motor control system for controlling a DC motor comprising:
   means for providing a DC reference signal representative of desired motor speed;
   means for providing a DC motor signal representative of actual motor speed;
   means responsive to said reference signal and to said motor signal for providing a DC error signal representative of the difference between said desired motor speed and said actual motor speed;
   DC amplifying means having input circuit means for receiving a said DC error signal to be amplified and having output circuit means for carrying a DC command signal proportional to said error signal and having a magnitude representative of the amount by which said motor speed must be changed;
   motor control means for controlling energization of said motor to vary the motor speed in dependence upon the magnitude of said command signal; and,
   dead band control means for effecting a dead band range of operation of said DC amplifying means to effectively nullify said DC command signal for achieving essentially zero motor speed comprising offset signal means for applying an offset signal to said input circuit means of amplifying means to oppose said error signal in such a manner as to effectively nullify said command signal only within a given range of magnitudes of said input reference signal representative of motor speed near zero so that throughout said given range of said reference signal a dead band range of operation is achieved, said offset signal means includes a negative feedback network interposed between said output and input circuit means of said amplifying means, said feedback network includes saturable amplifier means coupled to said output means of said amplifying means for providing an amplified output signal proportional to said command signal until said command signal attains a threshold level at which said saturable amplifier means saturates, and means responsive to said amplified output signal for providing said offset signal having a magnitude proportional to said amplified output signal and for applying said offset signal to said input circuit means of said amplifying means.

5. A motor control system as set forth in claim 4 wherein said dead band control means includes offset signal adjustable means for adjustably varying the magnitude of said offset signal in proportion to said amplified output signal so as to thereby adjustably vary the dead band range of operation of said amplifying means.

6. A motor control system as set forth in claim 5 wherein said adjustable means includes manually operable means for adjusting the magnitude of said offset signal.

7. A motor control system as set forth in claim 4 wherein said saturable amplifying means includes an output circuit for carrying an output voltage signal which varies in magnitude up to the saturation level of said saturable amplifier means, circuit means connected to said output circuit for deriving therefrom a said offset signal exhibiting a magnitude proportional to said voltage signal for application to the input circuit means of said amplifying means.

8. A motor control system as set forth in claim 7 wherein said circuit means includes a potentiometer having a resistance portion connected to the output circuit of said saturable amplifier means, and a adjustable wiper arm connected to said resistance portion to adjustably derive a said offset signal for adjusting said dead band range of operation.

9. A motor control system as set forth in claim 4 wherein said amplifying means includes first and second operational amplifiers connected in series between said input circuit means and said output circuit means.

10. A motor control system for controlling a DC motor comprising:
means for providing a DC reference signal representative of desired motor speed;
means for providing a DC motor signal representative of actual motor speed;
responsive to said reference signal and to said motor signal for providing a DC error signal representative of the difference between said desired motor speed and said actual motor speed;
DC amplifying means having input circuit means for receiving a DC error signal to be amplified and having output circuit means for carrying a DC command signal proportional to said error signal and having a magnitude representative of the amount by which said motor speed must be changed;
motor control means for controlling energization of said motor to vary the motor speed in dependence upon the magnitude of said command signal; and,
dead band control means for effecting a dead band range of operation of said DC amplifying means to effectively nullify said DC command signal for achieving essentially zero motor speed comprising offset signal means for applying an offset signal to said input circuit means of said amplifying means to oppose said error signal in such a manner as to effectively nullify said command signal only within a given range of magnitudes of said input reference signal representative of motor speed near zero so that throughout said given range of said reference signal a dead band range of operation is achieved, said offset signal means includes a negative feedback network interposed between said output and input circuit means of said amplifying means, said amplifying means includes first and second operational amplifiers connected in series between said input circuit means and said output circuit means, said offset signal means includes means for limiting the operation of said negative feedback network so as to be effective only over given range of magnitudes of said input reference signal, said feedback network includes a saturable amplifier.

11. A motor control system for controlling an electrical motor comprising:
means for providing a DC reference signal representative of desired motor operation;
means for providing a DC motor signal representative of actual motor operation;
means responsive to said reference signal and to said actual operating signal for providing an error signal representative of the difference between said desired motor operation and said actual motor operation;
amplifying means having input circuit means for receiving a said error signal to be amplified and having output circuit means for carrying a command signal proportional to said error signal and having a magnitude representative of the amount by which said motor operation must be changed;
motor control means for controlling energization of said motor to vary the motor operation in dependence upon the magnitude of said command signal; and,
dead band control means for effecting a dead band range of operation of said amplifying means to effectively nullify said command signal comprising offset signal means for applying an offset signal to said input circuit means of said amplifying means to oppose said error signal in such a manner as to effectively nullify said command signal only within a given range of magnitudes of said input reference signal representative of motor speed near zero so that throughout said given range of said reference signal a dead band range of operation is achieved, said offset signal means including saturable amplifier means coupled to said output means of said amplifying means for providing an amplified output signal proportional to said command signal until said command signal attains a threshold level at which said saturable amplifier means saturates.

12. A control system for controlling a motor comprising:
amplifying means having input circuit means for receiving an input signal to be amplified and having output circuit means for carrying a command signal proportional to said input signal, motor control means for controlling energization of said motor in dependence upon the magnitude of said command signal, and, dead band control means for effecting a dead band range of operation of said amplifying means to effectively mullify said command signal comprising offset signal means for applying an offset signal to said input circuit means of said amplifying means to oppose said input signal in such a manner as to effectively nullify said command signal only within a given range of magnitudes of said input signal so that throughout said given range of said input signal a dead band range of operation is achieved, said offset signal means including saturable amplifier means coupled to said output means of said amplifying means for providing an amplified output signal proportional to said command signal until said command signal attains a threshold level at which said saturable amplifier means saturates.

* * * * *